METHOD AND APPARATUS FOR TREATING SEMICONDUCTOR WAFERS

Filed Oct. 26, 1965 6 Sheets-Sheet 1

INVENTORS.
RICHARD D. PRICE
FREDERICK W. KULICKE, JR.
BERNARD JACOBS
BY
Bilker, Kimmelman & Mogerman
ATTORNEYS.

METHOD AND APPARATUS FOR TREATING SEMICONDUCTOR WAFERS

Filed Oct. 26, 1965 6 Sheets-Sheet 2

INVENTORS.
RICHARD D. PRICE
FREDERICK W. KULICKE, JR
BERNARD JACOBS
BY
Silber, Kimmelman & Mayerman
ATTORNEYS.

INVENTORS.
RICHARD D. PRICE
FREDERICK W. KULICKE, JR.
BERNARD JACOBS
BY
Bilbes, Kimmelman & Mayers
ATTORNEYS.

METHOD AND APPARATUS FOR TREATING SEMICONDUCTOR WAFERS

Filed Oct. 26, 1965 6 Sheets-Sheet 4

INVENTORS.
RICHARD D. PRICE
FREDERICK W. KULICKE, JR.
BERNARD JACOBS
BY
Bilher, Kimmelman & Moyerma
ATTORNEYS.

INVENTORS.
RICHARD D. PRICE
FREDERICK W. KULICKE, JR.
BERNARD JACOBS
BY
Pilcher, Kunselman & Magers
ATTORNEYS.

INVENTORS.
RICHARD D. PRICE
FREDERICK W. KULICKE, JR.
BERNARD JACOBS
BY
Bilker, Kimmelman & Mayer
ATTORNEYS.

United States Patent Office 3,489,608
Patented Jan. 13, 1970

3,489,608
METHOD AND APPARATUS FOR TREATING SEMICONDUCTOR WAFERS

Bernard Jacobs, Tokyo, Japan, Frederick W. Kulicke, Jr., Philadelphia, and Richard D. Price, Green Lane, Pa., assignors to Kulicke and Soffa Industries, Inc., Fort Washington, Pa., a corporation of Pennsylvania Filed Oct. 26, 1965, Ser. No. 505,248
Int. Cl. B08b 3/08
U.S. Cl. 134—25 9 Claims

ABSTRACT OF THE DISCLOSURE

For rapidly chemically treating a plurality of semiconductor wafers, an apparatus having a turntable provided with a plurality of vacuum chucks for detachably receiving and holding wafers thereon for presenting them under spray heads, a serving tray carrying the wafers which tray is mountable on the turntable to simultaneously deposit the wafers on the chucks and is removable therefrom to remove the wafers.

This invention relates to a method and apparatus for cleaning, developing, etching and/or stripping thin disks, such as semiconductor wafer slices, by a wet chemical and washing treatment. More particularly, the present invention concerns the automatically controlled wet processing of thin semiconductor slabs or wafers by immersion in vapor saturated environments produced by atomized sprays of treating chemicals and fluids in successive stages for predetermined intervals and at adjustable timed cycles. Furthermore, the method and apparatus of the instant invention contemplates the handling of a plurality of the wafers simultaneously and includes their transport to and through the various processing stations by a unique carrier system which eliminates individual disposition after initial loading. Still other aspects of the instant invention are connected with the advancement in the technology of chemically treating semiconductor wafers from the laboratory individual handling system to a highly refined high production technique.

In the manufacture of semiconductor devices such as transistors, diodes and microcircuits, relatively thin slabs are transversely sliced from ingots of semiconductor crystals. These slices are commonly ten to twenty mils thick, and, by virtue of non-unifonrm crystal pulling techniques, the wafers are generally irregular in configuration with a surface area in the order of one square inch. Usually the semiconductor wafers are fabricated of such materials as germanium and silicon which are not only extremely hard but also extremely brittle and fragile. The wafers are lapped and polished to a thickness of perhaps a few mils and subsequently they have applied thereto repeating patterns of "geometry" through a series of masking, etching and infusing steps such that a plurality of individual chips may be diced from regularly defined rows and files of duplicating "geometry" on a single slice.

In the fabrication of semiconductive devices, a series of discrete liquid treatment and washing steps are required in order to prepare the surface of the wafer slice for subsequent operations or in fact even to perform the operation itself. For example, just to clean the wafer preparatory to the application of a resist coating or evaporation of a metallized film upon its surface, it is usually necessary to thoroughly wash and degrease the slice of all organic and inorganic contaminants. With respect to the cleansing of the semiconductive surfaces of foreign organic substances, immersion in detergents and in such solvents as acetone, trichlorethylene is common, and this followed by de-ionized and de-mineralized water rinses, methyl alcohol rinses or equivalents. To remove inorganic contaminants, the slices may be exposed to the action of hot sulfuric acid.

As part of the process of incorporating the chip geometry upon the wafers, as many as a few hundred perhaps on a single slice, a pattern is imprinted upon a photoresist coating, such as Eastman Kodak KPR, applied to the wafer by exposing the resist to ultraviolet light through a mask or stencil. After exposure of the photoresist, the unexposed portions thereof are dissolved and removed by developing the resist in a suitable liquid developer. This is followed by immersion in a solution which will harden the remaining masked portion of the developed resist. Thereafter, the slices are rinsed in water, dried and baked preparatory to plating, evaporating or oxide etching.

In oxide etching, mesa etching, or dice etching of the semiconductor wafers, areas of the surface of the wafer are exposed to the action of various liquid etchants while the remaining areas are masked to prevent the attack of such chemicals. For example, an aqueous solution of sodium hypochlorite (NaOCl) may be utilized as an etchant for germanium while a suitable mask may be composed of bismuth trioxide ($BiO_3$) and/or noble metals and alloys thereof. A suitable etchant for the oxide film on a silicon semiconductor slab might be dilute hydrofluoric acid alone or in combination with nitric acid. In any event, following immersion in the appropriate etchant, the wafers are again washed in de-ionized wafer and alcohol rinses followed by a drying cycle in preparation for the next operation.

Yet another chemical treatment to which the wafers are subjected in the course of their preparation is a stripping operation whose function is to remove the photo-resist or wax prior to returning the semiconductor to the furnace. Some of the commonly used solvents for removal of the remaining exposed mask material are trichlorethylene, methylene chloride, and in certain instances hot concentrated sulfuric acid.

All of these steps had been previously accomplished by what may now be considered as crude laboratory techniques. Examples of the various phases of technology to which the instant invention is applicable may be ascertained by reference to such U.S. patents as No. 2,897,778, No. 3,012,920, No. 3,046,176, No. 3,103,733, and No. 3,157,937.

It is therefore an object of this invention to provide a high production technique for subjecting semiconductor wafer slices to liquid and chemical treatment and further to provide means and apparatus for handling such wafers during all phases of cleaning, developing, etching and stripping operations.

Another object of this invention is to provide an improved method and apparatus for exposing semiconductor wafer disks to intimate surface interaction with liquid chemicals.

Still another object of this invention is to provide a unique carrier system to transport semiconductor wafer slices from station to station in bulk without subjecting them to likelihood of contamination stains or other destructive effects.

Yet another object of this invention is to provide an apparatus for directing fine sprays of liquid chemicals and detergents upon the surface of semiconductor slices in controlled but adjustable timed sequences and exposure periods.

A still further object of this invention is to provide a wet liquid treatment apparatus which advances the previous laboratory treatment of semiconductor wafers to high production techniques.

Yet a further object of this invention is to provide an apparatus which will treat semiconductor wafers automatically and expose them to a wide variety of treatment cycles under an adjustably programmed sequence of events.

Yet still another object of this invention is to subject semiconductor wafers to fine sprays of liquid chemicals and inert gases.

An additional object of this invention is to provide a liquid treatment apparatus which is easily dissassembled for replacement of eroded or worn components.

Other objects of this invention are to provide an improved device and method of the character described which is easily and economically produced, sturdy in construction, and which is highly efficient and effective in operation.

With the above and related objects in view, this invention consists of the details of construction and combination of parts as will be more fully understood from the following detailed description when read in conjunction with the accompanying drawings, in which.

Figure 1:
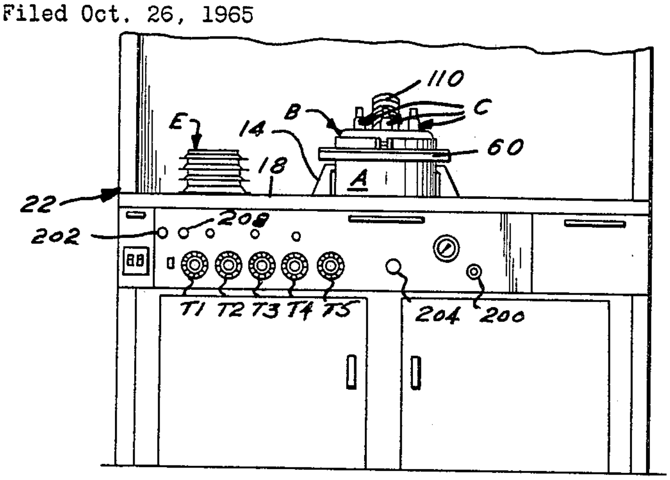
FIGURE 1 is a front elevational view of an apparatus for wet chemical treatment of thin semiconductor wafer disks in accordance with the embodiments of this invention.

Referring now in greater detail to the drawings in which similar reference characters refer to similar parts, we show a liquid chemical and wet washing apparatus comprising a frame and a housing assembly, generally designated as A, a closure lid therefor, generally designated as B, a plurality of spray heads C mounted in the lid for sequentially directing a fog or mist or respective treatment chemicals into the housing chamber, a chuck D rotatably supported within the housing and adapted to support a plurality of semiconductor wafers or disk elements X so as to expose them to the various nebulized atmospheres, and carrier means E for transporting all of the disks simultaneously into engagement with the chuck for spray treatment and thereafter to remove them all simultaneously from the chamber when treatment is completed preparatory to subsequent operations or for storage.

Figure 2:
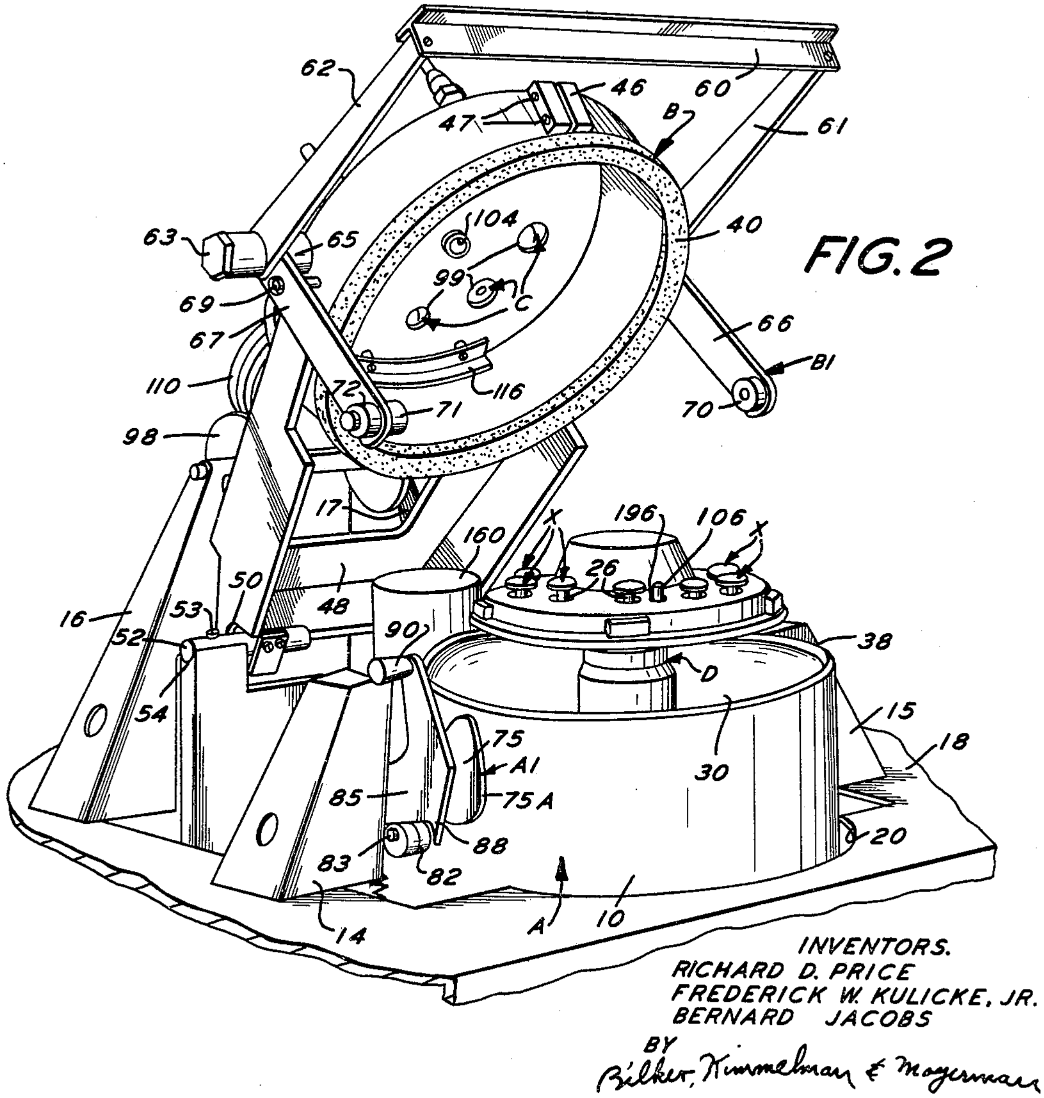
FIGURE 2 is a perspective view of the wafer washing apparatus in open position.
Figure 3:
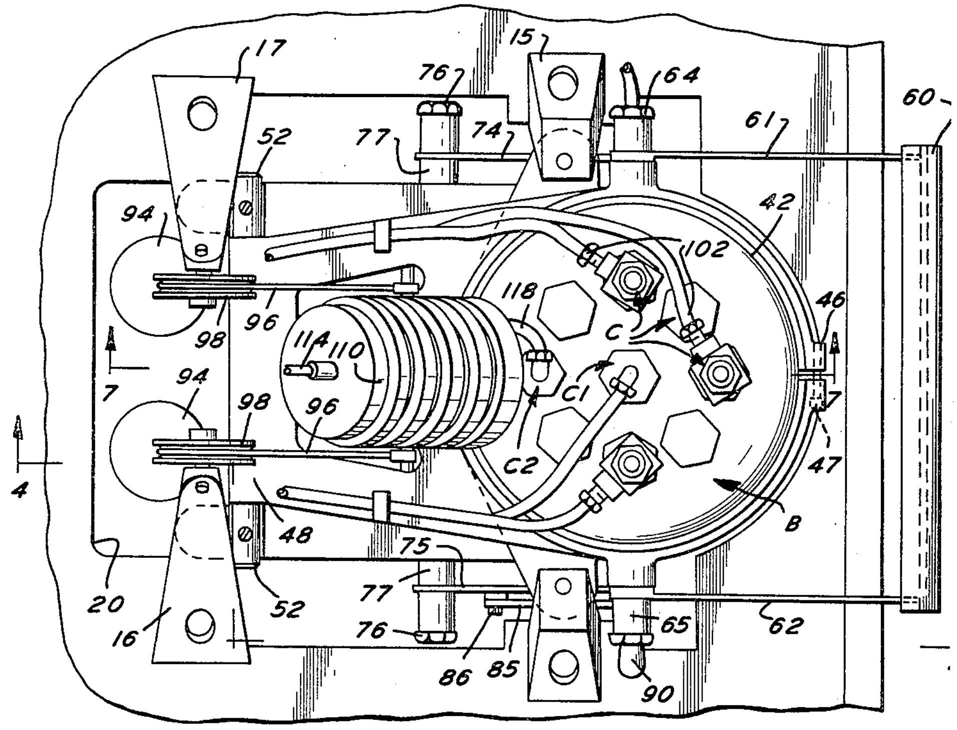
FIGURE 3 is a top plan view of the wafer washing apparatus in closed position.

The frame A is preferably cast of a strong lightweight metal, such as aluminum, and includes a forward cylindrical portion 10, which defines a housing for the treatment pot, and a rear platform portion 12, which hingedly supports the closure lid B. See FIGURES 2, 3 and 4. The entire frame A is supported by four mounting blocks or pedestals 14, 15, 16 and 17 which are secured to a cabinet, table top or work counter 18. These pedestal blocks suspend the lower part of the cylindrical housing and platform within a suitable cut-out 20 in the counter so as to permit the loading and unloading operations of the apparatus at a convenient work level. As is apparent from FIGURE 1, the apparatus may be further enclosed within a dust hood or ultra-clean work station 22 for cleanliness and best contamination control.

Figures 6, 7:
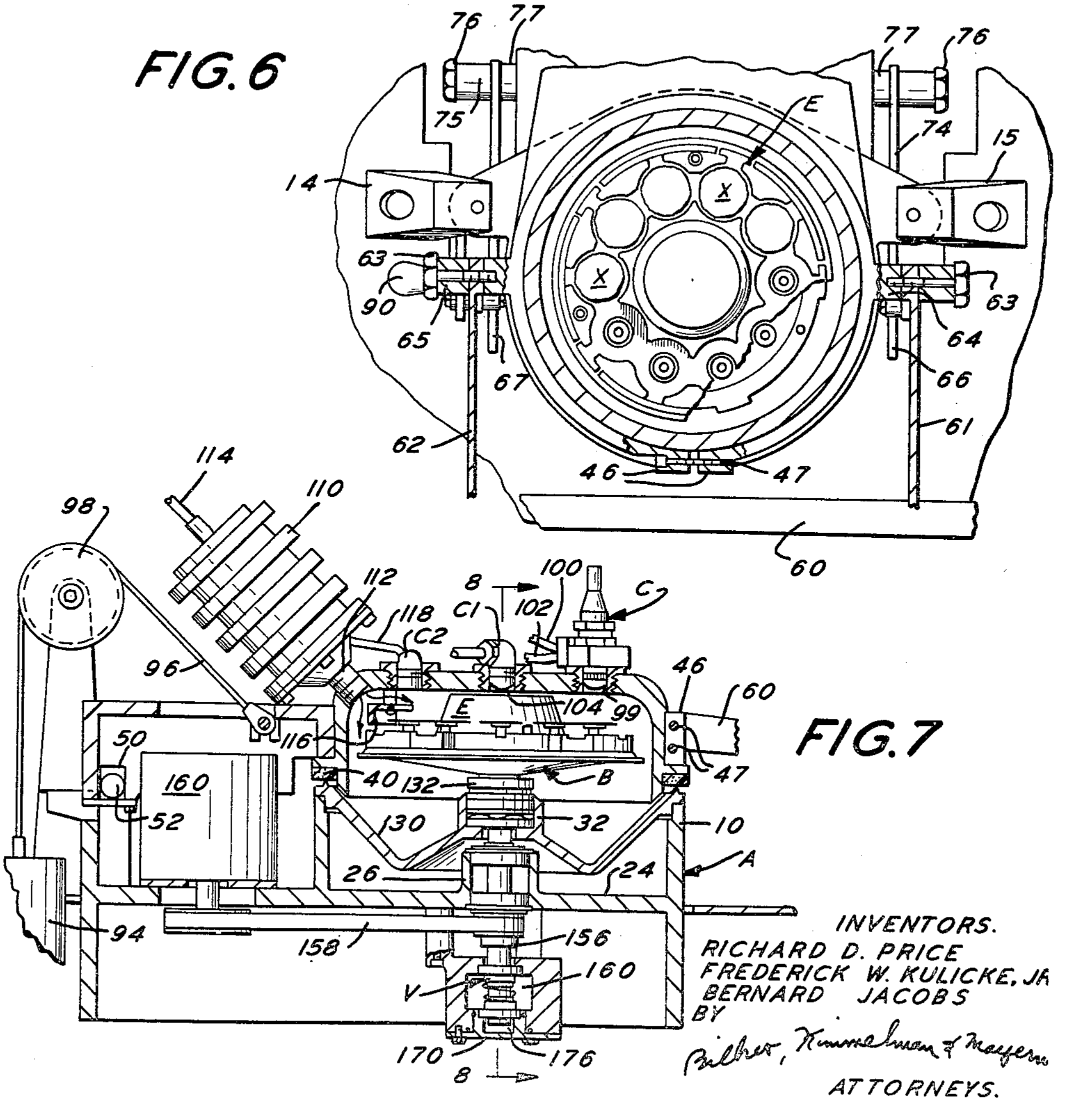
FIGURE 6 is a sectional view taken along lines 6—6 of FIGURE 5.
FIGURE 7 is a sectional view taken along lines 7—7 of FIGURE 3.
Figure 8:
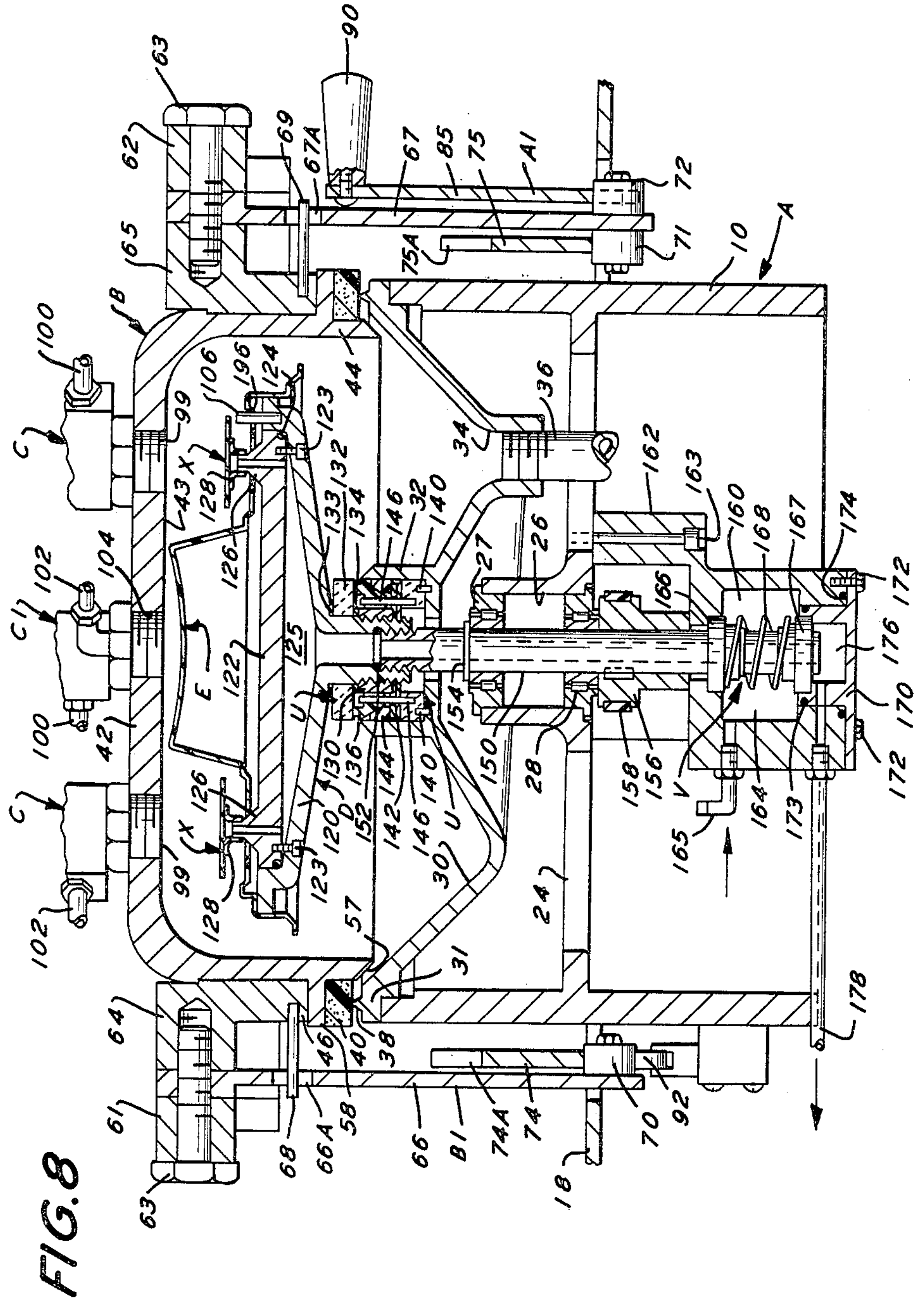
FIGURE 8 is a sectional view taken along lines 8—8 of FIGURE 7.

Referring now to FIGURES 7 and 8, the cylindrical housing 10 has a horizontally-disposed medial spider 24 whose central pod 26 contains an upper bearing 27 and lower bearing 28 for mechanically supporting and journalling the rotatable chuck or turntable D. A pan 30 or liquid sump is supported within the housing 10 and has a circumferential flange 31 which seats within the upper periphery thereof. The pan 30 is generally of an upwardly-concave toroidal configuration and includes a central well portion 32 which supports a vapor and liquid rotary seal U for the turntable member D. A sump drain 34 has a pipe 36 threaded therein for carrying off used treatment and wash liquids by gravity to a suitable receptacle (not shown but located under the work counter 18). The upper surface of the flange 31 has an upwardly projecting circular ridge 38 which is inverted V-shaped in cross-section and is adapted to bite into and form a low gradient seal with a soft gasket 40 at the lower marginal edge of the lid closure B.

Referring to FIGURES 2, 3, 4 and 5, the closure lid B includes a dome 42 of cast or spun metal, such as aluminum, or of a suitable molded plastic composition which is organic and inorganic solvent resistant, such as "Penton," made by Hercules Powder Co. of Wilmington, Del. The dome 42 is generally circular in cross-section and has a downwardly concave canopied interior 43 with a cylindrical side wall 44 complementary with the housing 10. A split clamp 46, which is tightened down by screws 47, embraces the dome 42 securely in place within support member 48 but permits its removal for rapid interchangeability when and if solvent erosion should occur. The rearward end of the support member 48 (left hand portion of FIGURE 4) is slotted at 50 whereby the entire hood B is adapted to freely pivot about trunnions 52. Each trunnion 52 is secured by screws 53 within V-groove 54 machined in the upper edge of pivot yoke 56 which extends upwardly from platform 12. Elongating or slotting the apertures 50 permits the support member 48 to "rock" slightly as well as pivot about the trunnions 52 whereby the dome 42 can find a proper seat when closed into engagement with the pot 30. The lower outer periphery of the dome 42 is beveled at 57 so as not to interfere with the concavity of the pan 30 and yet overlie the same when closure is made. The gasket 40 may be of a soft synthetic rubber, such as neoprene, for resistance to solvent attack and provides a low gradient seal under flange 58.

A dead man's latching assembly A1 is arranged at the sides of the housing 10 and cooperates with a locking assembly B1 on the lid B so as to insure positive closure of the hood and prevent accidental release thereof during the cycle of operation. See FIGURES 2, 4, 5 and 8. The locking assembly B1 includes a U-shaped handle 60 whose arms 61 and 62 are rotatably supported on pivot bolts 63 which threadedly engage lugs 64 and 65 formed as ears on the support member 48. Legs 66 and 67 are welded to or are integrally formed with the arms 61 and 62 respectively and downwardly depend therefrom. Lift pins 68 and 69 outwardly extend from the support member 48 and project through openings 66A and 67A whose marginal edges limit the degree of pivotal movement of the handle 60 itself. Cam follower rollers 70 and 71 are mounted at the lower inboard ends of the respective legs 66 and 67, a lock roller 72 being supported at the outboard face of the leg 67 co-axial with roller 71. The rollers 70 and 71 are adapted to follow the contour of the arcuate cam surfaces 74A and 75A formed at the sole of guide track feet 74 and 75 and engage under the heel portions thereof. The guide track feet 74 and 75 are supported by bolts 76 which threadedly engage within bosses 77 at the lower sides of the housing 10. Springs 78 tensioned between hangers 79 on the guide track feet and pins 80 on the frame A bias the bottom edge or calf of each guide track foot against an eccentric stop 82. The eccentric stops 82 are oriented about screws 83 so as to adjust the guide tracks 74 and 75 about the bolts 76 whereby the followers 70 and 71 when engaged under the heels of the tracks will insure proper sealing pressure of the hood B acting against its gasket 40 and ridge 38. Screws 83 and bolts 76 are tightened after the adjustment is made.

Figure 4:
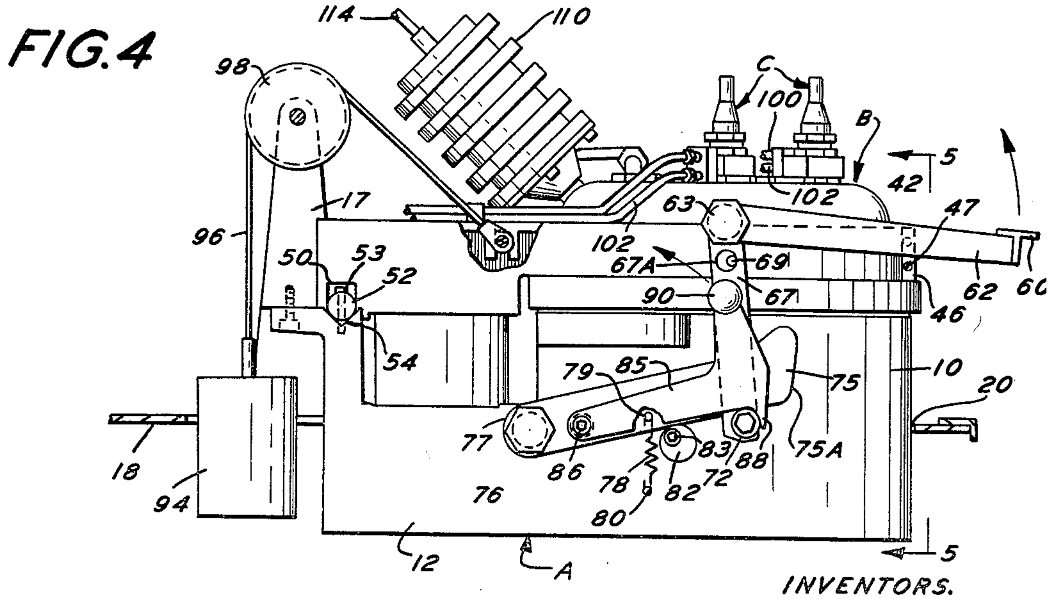
FIGURE 4 is a sectional view taken along lines 4—4 of FIGURE 3.
Figure 5:
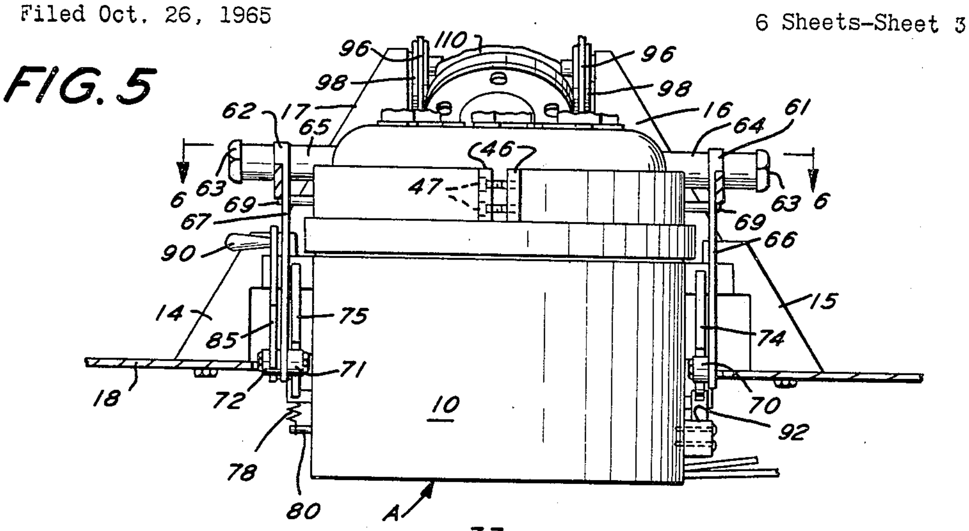
FIGURE 5 is a sectional view taken along lines 5—5 of FIGURE 4.

A locking link 85 is pivotally supported on a stud 86 extending outwardly from the exterior side of guide track 75 and has a pawl 88 downwardly projecting from its toe for grasping the lock roller 72. The locking link 85 normally rests by gravity upon the head of the socket head cap screw 83 until the lock roller 72 is grasped by the pawl 88. Once the pawl 88 has locked in the roller 72, and hence the entire hood B, it is necessary to rotate or pivot the locking link 85 by lifting knob 90 in a counterclockwise direction, as shown in FIGURE 4, in order to release the lift handle 60. It is also important to note that the roller 70 bears against the finger of a normally-open microswitch 92 when the lid B is closed, the contacts of the microswitch being in series with the motor and timer circuits, to be described hereinafter. Thus the microswitch 92 operates as a safety interlock and prevents actuation of both the spray heads and motor drive when the lid B is open.

Suitable counterweights 94 are suspended from cables 96 carried over pulleys 98 and coupled to the medial portion of the hood support bracket 48. The pulleys 98 are rotatably supported at the top of the rear pedestal blocks 16 and 17 which also suspend the platform portion 12 of the frame A. Thus, the entire hood support B is pivotally balanced so as to be easily locked in position by pushing downwardly on the lift handle 60. The rollers 70 and 71 will find and then follow the respective cam surfaces 74A and 75A until they are automatically locked under the heels thereof once roller 72 is grasped by the toe pawl of dead man's link 85. The limited pivotal action of the lift handle 60, resulting from permissible swinging movement of the apertures 66A and 67A on lift pins 68 and 69, enables both the capture and release of the rollers 70 and 71 under the heel of the cam tracks 74 and 75.

The spray elements C are aspiration-type liquid spray devices, such as Model No. 2FC nozzles, made by Spraying Devices, Inc. of Bellwood, Ill. The nozzles may be stainless steel or of plastic construction and can either emit a flat fan-shaped pattern or a round full conical pattern. They are received in respective circumferentially-spaced apertures 99 in the dome canopy 42 and direct a fog of mist-like spray of liquid upon the wafers X as they move past on the turntable D. Each nozzle head C is connected by tubing 100 to a particular liquid chemical tank or reservoir which sits (not shown) under the cabinet 18. Each nozzle head is also connected to a source of air under pressure by means of an aspiration line 102. The various air lines have solenoid actuated valves (see FIGURE 12) which are controlled by electrical timers so that a programmed cycle of liquid treatment may be sequentially performed, all of which will be more fully described hereinafter. The central aperture 104 in the dome 42 carries a head C1 which, instead of performing a spray function, merely impinges a stream of water upon a a dished portion of the carrier E. As the turntable D rotates, the water collecting in the disk is thrown out as a centrifugal sheet for the purpose of washing the interior pot itself rather than the disks X. See FIGURE 7.

In addition to the spray liquid treatment and washing steps, means are provided for directing a flow of heated gas into the chamber both for the purpose of drying the interior of the pot as well as the disks themselves after washing is completed. In FIGURE 7, there is shown an electric heating cylinder 110 which is connected to a port 112 in the dome 42 and is further coupled to a supply of compressed inert gas, such as nitrogen, by way of tubing 114. The heated gas passing into the port 112 is directed by an arcuate baffle 116 which is L-shaped in cross-section along the concave top surface of the canopy 43 and the cylindrical side walls 44 to effect drying of the pot itself. A bleed line 118 takes a portion of the heated gas from the electric heating element 110 and directs it through a pneumatic nozzle C2 where the drying gas is impinged directly upon the upper surface of the disks X as they are rotated thereby on the chuck D.

Referring now to FIGURE 8, the turntable or chuck D comprises a funnel-shaped member 120 upon which is mounted a circular platen 122 so as to define a conically-shaped vacuum plenum 125 therebetween. Screws 123 draw the periphery of the platen 122 downwardly against an O-ring or gasket 124 to seal the plenum. A plurality of pedestals 126 are circumferentially spaced about the platen and project thereabove. Each pedestal 126 has a central bore which communicates with the plenum 125. Flared or tulip-shaped plastic cups 128 are mounted about the upstanding ends of the pedestals and provide a resilient chuck support 126 for the disks X when they are drawn down thereon by the vacuum.

The lower portion of the funnel 120 has an exteriorly threaded neck portion upon which the upper or rotatable portion of the seal U is retained by a nut 130. The rotatable portion of the seal U includes a Teflon seat 132 which is sandwiched between ring 133 and gasket 134 and glides on a carbon filled stationary washer seat or disk 136. The lower or stationary portion of the seal U is dropped in the well 32 and includes a retainer disk 138 which is keyed against rotation in the well by locator pins 140. Spring or wave washer 142 sits on disk 138 and resiliently supports bevel ring 144 which embraces the complementary bevelled surface of the stationary seat 136. Pins 146 integrate the lower portion of the seal U by passing through openings in the respective components.

The funnel member 120 which supports the platen 122 is detachably secured to the upper threaded end of tubular shaft 150. As seen in FIGURE 8, the end of the shaft 150 is tightened down against an O-ring 152 which abuts an internal shoulder within the neck of the funnel to afford a good vacuum seal but a separable joint. After the shaft 150 is secured within the funnel 120, which already has the rotary portion of the seal U mounted thereon, the shaft is passed through the various elements of the stationary lower portion of the upper seal U and thereafter through the inner races of the mechanical bearings 27 and 28. A Teflon shield 154 mounted on the shaft 150 protects the mechanical bearings from possible leakage through the upper vapor-liquid seal U.

A pulley 156 is keyed to the shaft 150 and a timing belt 158 couples the pulley and drive shaft to motor drive unit 160, as best shown in FIGURE 7. The motor 160 drives the turntable chuck D at a speed from between 150 and 300 r.p.m. A greater speed could lead to shearing of the vacuum joint at the chuck disk interface.

Referring back to FIGURE 8, it may be seen that the lower portion of the tubular shaft 150 is rotatably supported within a rotary vacuum seal V. The seal V includes a casing 162 which is secured to and downwardly depends from the spider 24 by bolts 163. The casing 162 has a chamber or gland 164 which is kept filled with oil by static reservoir 165. Oil seal rings 166 and 167 on the shaft 150 are urged against upper and lower gland seats by spring 168. Cap plug 170 is inserted within and is secured to the casing 162 by screws 172 and suitable O-rings 173 and 174 seal and prevent leakage of oil. The interior portion of the cap 170 has a recessed chamber 176 which interconnects the bore of shaft 150 with an exhaust line 178.

Figure 9:
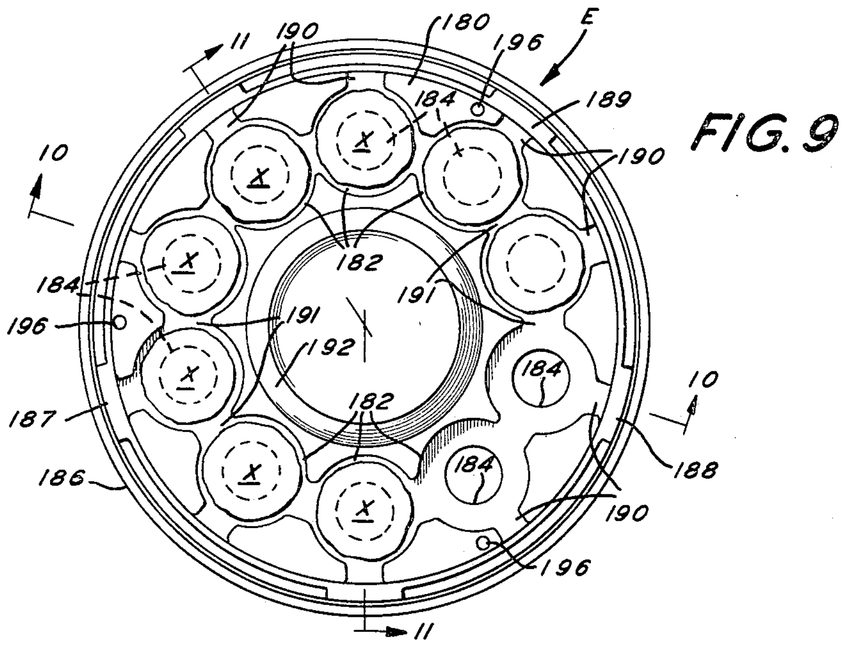
FIGURE 9 is a top plan view of a wafer carrying tray embodying this invention.
Figure 10:
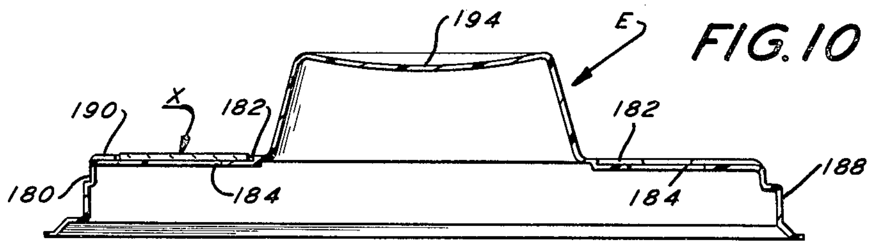
FIGURE 10 is a sectional view taken along lines 10—10 of FIGURE 9.
Figure 11:
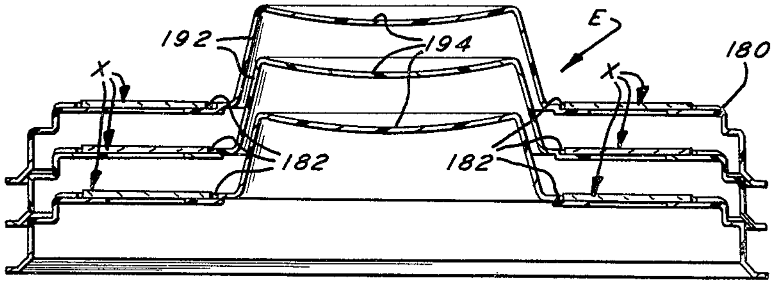
FIGURE 11 is a sectional view taken along lines 11—11 of FIGURE 9.

Referring now to FIGURES 9, 10 and 11, the carriers E comprise an integrally formed generally circular tray which may be molded of a suitable plastic material, such as polyethylene, or stamped from metal, such as aluminum, appropriately coated with a suitable acid and solvent resistant surface. Each carrier has a tray portion 180 with a plurality of circumferentially-spaced recessed portions 182 which are somewhat larger than the largest sized wafer anticipated so as to define a pocket therefor.

A central opening 184 which is smaller than the wafer diameter, passes through each pocket 182 and is large enough to receive freely the turntable pedestals 126 and their flared cups 178. A skirt 186 peripherally depends from the tray portion and three outwardly extending nodules 187, 188 and 189 formed therein act as shelves for vertically stacking the carriers one upon one another, as shown in FIGURE 11, so as to space the upper surface of the wafers from any contacting surface during nesting of the carriers. A channel 190 having the same depth as the pockets radially extends outwardly from each of them and act as means to permit liquid to drain from the trays while the wafers are supported in the pockets. Passageways 191 interconnecting adjacent pockets 182 also act as a relief for the same purpose. Each carrier E has an upwardly extending centrally disposed cupola 192 which functions as a handle for carrying the trays about. The upper portion of each cupola 192 is concavely dished at 194 in the manner of a basin. When the carrier E is mounted on the turntable D the basin portion collects water from the central head C1 and then throws this water out centrifugally as a sheet during rotation of the table so as to effectively wash the interior of the vessel B. Locating or indexing holes 196 are triangularly spaced about the tray portion 180 and are adapted to be received on pins 106 upstanding from the platen 122. The pins 106 are indexed with the holes 196 so as to facilitate positioning of the carrier upon the turntable D by eye. It is also to be noted that the various carriers E can be nested in compact disposition without the wafers X carried therein by orienting the nodules 187, 188 and 189 on the various trays into registration with each other.

Figure 12:
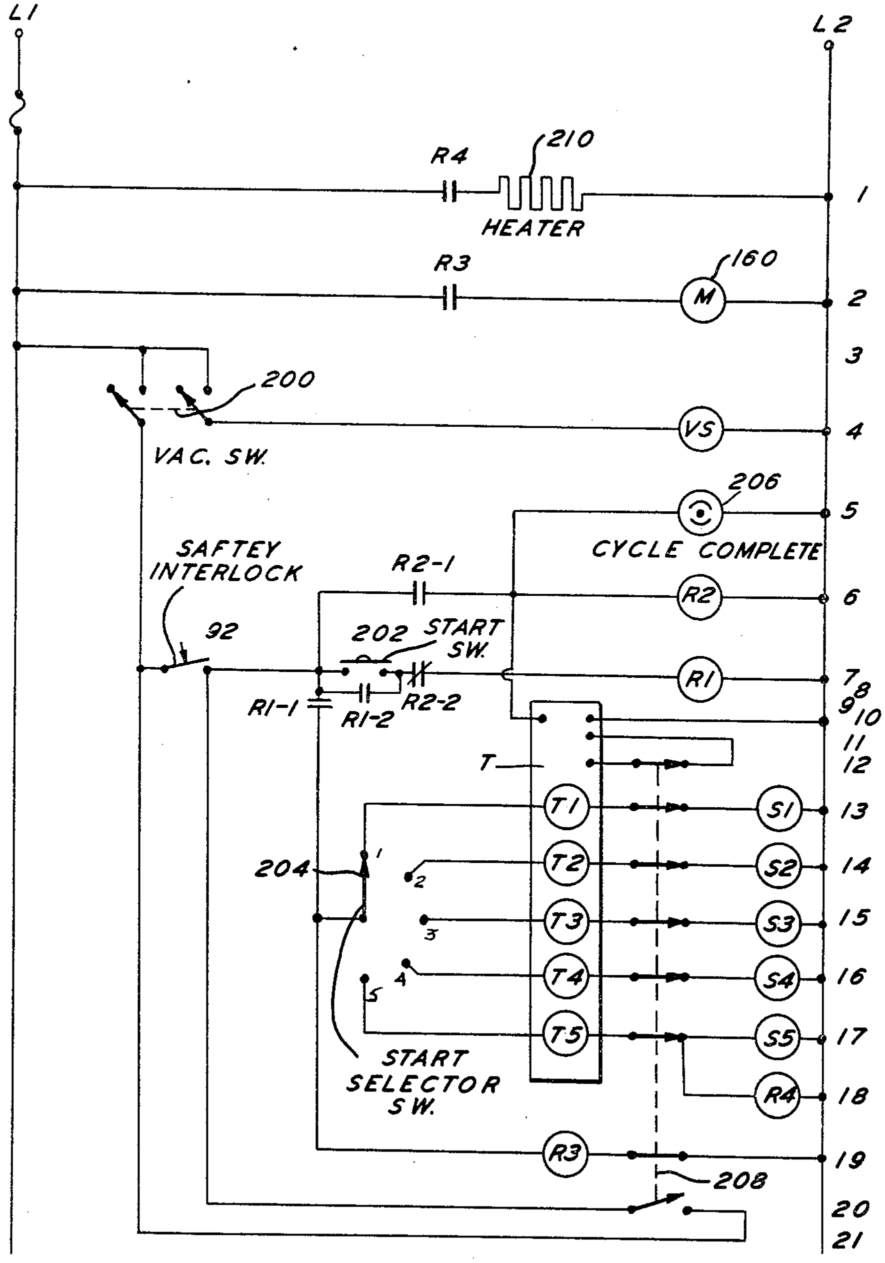
FIGURE 12 is a schematic representation of the across-the-line electrical diagram embodied in this invention.

Referring now to the circuit diagram of FIGURE 12, the mode of operation of the foregoing apparatus will now be explained in detail. All electrical circuit components are shown between 115-volt A.C. power lines L1–L2 in across-the-line schematic form. A marginal key has been employed in order to correlate the location of the various coils, contactors, switches and motor in connection with the sequence of their operation. The various horizontal lines are identified with reference numerals in the right-hand margin of FIGURE 12 adjacent the power supply line L2. Relays, motor, and solenoid coils are indicated with encircled letters in the particular horizontal line. Relay contacts are designated with the same letter prefixes as the relay coils themselves there. In addition, all relay contactors which are shown as being normally closed in the schematic will be identified with underlining in the specification. For example, normally-open R2–1 contact in line 6 will have no underlining whereas the normally-closed pair of R2–2 contacts in line 7 are underlined. All contacts are shown at ready-to-start position.

With 115-volts A.C. applied across the leads L1–L2, closing vacuum switch 200 on panel board 18 energizes vacuum solenoid VS (line 4 of the schematic diagram) and opens a valve which is physically located in the exhaust tubing or pipe 178 which goes to the vacuum chamber 176. Accordingly, a suction will be drawn through the various pedestals 126 in the turntable D. As soon as flat disks X, such as semiconductor wafers, are applied to the top of the pedestals or their flared cups 128, they will be drawn by vacuum into suction engagement with the chucks. It is also to be noted that the movable arm of the double-pole, double-throw vacuum switch 200 is coupled to the safety interlock microswitch 92, the latter being operative upon closure of the lid B and opening when the lid itself is opened. With the safety interlock microswitch 92 closed, the operation may be started by pressing the start switch 202 thereby energizing relay R1 through normally-closed contacts R2–2 all of which are located in line 7. Hold contacts R1–2 will now be maintained closed across the start switch 202 and R1–1 contacts in line 9 will close to supply power to the start selector switch 204 and relay R3 in line 19. Energizing relay R3 closes its contacts R3 (line 2) to supply power to the motor drive 160 thereby causing rotation of the turntable D through belt 158 and pulley 156.

Coupled to the start selector switch 204 is a multiple event, sequential programming assembly T, such as a Tempo Model No. 650435, made by Tempo Instruments, Inc. of Plainview, New York. This is a transistorized timing device consisting of five individually adjustable timers T1, T2, T3, T4 and T5 which are sequentially actuated and successively energize respective loads coupled thereto. Upon application of an input voltage to the first timer T1, both it and its load number one (solenoid S1) are energized. After completion of the adjustable time period (0–6 minutes), timer T1 times out, de-energizing its load, and then energizing timer T2 and its load, solenoid S2. This sequence continues until load number five de-energizes, at which time a pulse will be applied to relay R2 (line 6) so as to close its normally-open R2–1 contacts and then after a short delay open its normally-closed R2–2 contacts. Closure of the R2–1 contacts, in line 6, energizes cycle complete lamp 206 and indicates to the operator of the apparatus that the cycle is over. Since R2–2 in line 7 has opened, relay R1 is de-energized so as to open R1–1 (line 9) and cut out the timing sequence and the motor 160 in preparation for the next cycle.

Solenoid S1 which is energized during the entire period set on timer T1 is operative to actuate one of the spray heads C and causes it to emit a spray of a particular chemical. That is, solenoid S1 functions to open a valve (not shown) in the air supply line 102 of that particular head C and effects the aspiration of liquid from line 100 connected to a detergent tank, for example. When the preset time on T1 has expired, solenoid S1 will be de-energized and next solenoid S2 will be actuated and energized for the duration of the time set on timer T2. Accordingly, a spray of liquid such as de-ionized water, will bathe the rotating disks X as long as the valve in No. 2 spray aspirating air line is retained open by timer T2 and its solenoid S2. Solenoid S3 is then successively actuated by timer T3 for its prescribed time and causes the spraying of such a chemical as methyl alcohol through a third head C. Solenoid S4, actuated by T4, may operate a valve controlling the emission of water from the central spray head C, and function to wash the interior sides of the pot as the water is centrifuged out from the concave dish 104 at the top of the carrier E. Finally, solenoid S5, acted upon by timer T5 may function to operate a valve in the air or nitrogen supply line 114. Note also that a relay R4 is also coupled to timer T5 and, upon its actuation, closes contacts R4 in line 1 so as to energize the heater elements 210 which are located in the gas heat exchanger 110. Thus, as the gas is blown into the port 112 and also through pneumatic head C2, it will be simultaneously warmed so as to dry the interior of the pot as well as the rotating disks X.

It is to be observed that a ganged inhibit switch 208 is respectively connected in (closed) series position across the timer assembly T itself (line 12), the five solenoid loads, S1 to S5 inclusive, and the relay R3, as well as in (open) parallel position across the safety interlock 92. Opening of the inhibit switch permits the cycle to be interrupted at any time without interfering with the time periods or the sequential progress of events. The inhibit switch 208 thereby disconnects the motor 160 and all solenoids so as to act as a "fail-safe" mechanism for prevention of spray when the lid is open and also stop rotation of turntable D.

It is also to be noted that the selector switch 204 positions the start of the timer's sequence. For example, should it be desirable to start with a time period for a load other than number one, i.e.—solenoid S3, the selector switch is turned to that position number three. When the input voltage is applied, by closure of contacts R1–1 in line 9, load number three (solenoid S3) will be the first to energize and start the sequence next operative, load number four and finally timer T5, until load number five has completed the time cycle.

As is apparent from the foregoing description, the operating sequence for processing semiconductor wafer disks is as follows:

Semiconductor wafer disks are loaded into the various pockets 182 of an empty carrier E by means of a vacuum pencil or tweezers. Care must be taken that each pocket 182 is filled with a disk X in order to insure that each pedestal 126 of the vacuum chuck B will ultimately be loaded with a disk X. Note that a plurality of the carriers E containing semiconductor wafer disks X may be stacked vertically, as shown in FIGURE 11, either preparatory for or subsequent to treatment. In addition, the carriers E, of course, can be employed to transport the disks from one station to another.

A carrier E is mounted upon the turntable D of the apparatus by lowering the indexing holes 196 in the tray portion 180 upon the locating pins 106 upstanding from the platen 122. This insures that the pedestals 126 will be in alignment with the apertures 184 and engage a semiconductor disk as the carrier drops away. Suction has already been applied to the vacuum plenum 125 by virtue of closure of the vacuum switch 200 with attendant actuation of solenoid VS. Accordingly, each disk X will be firmly drawn into seated engagement with a pedestal 126 and held down thereon by suction. See FIGURE 2.

The lid B is now drawn downwardly by handle 60 until the latch assembly A1 has been engaged by the locking assembly B1. At this stage, the interlock microswitch 92 has been cocked closed preparatory to subjecting the wafers to automatic liquid treatment. Pressing the start button 202 will now cause the moter 160 to drive the turntable D by way of pulley 156 and timing belt 158. The period of time of exposure for each liquid treatment has been set on the various timers T1 through T5 inclusive. One spray head C at a time will direct a spray of liquid chemicals in a fine mist upon the rotating disk X. Each head C can be timed to spray for a period of from zero to six minutes. The apparatus may be so cycled as to spray liquid chemicals in any order desired from any of the spray heads as desired and omitting any spray head simply by setting its timer to zero. At the end of any spraying cycle, the pot can also be automatically washed, if desired, by connecting the spray head C1 at the center of the lid to a de-ionized water tank or reservoir containing solvent. As has been said before, the concave dish 194 of the suspended carrier E throws off the water as a centrifuged sheet against the interior sides of the lid and vessel. At the conclusion of the washing cycle, heated air or nitrogen is directed into the chamber automatically for a prescribed period of time so as to dry the wafer disks as well as the interior of the pot itself. At the end of the treatment cycle, the timer unit T will shut off completely and stop the motor drive 160. Completion of the cycle will be indicated by the lamp 206.

The chamber is opened upon release of the dead man's latch A1 by pushing upon the knob 90 and then drawing the handle 60 upwardly. At this stage, the vacuum to the pedestals 126 may be shut off by opening the vacuum switch 200. All of the wafers X are simultaneously lifted from the pedestals by raising the carrier E which had been previously suspended thereon and rotatable therewith. The wafers X pocketed in the recessed portions 182 of the carrier E may now stored for subsequent operation in a nested stack with other carriers.

Up to eight different chemicals can be accommodated in this apparatus. In this connection, a second programmer T can be connected to the output of timer T5 whereby another sequence of timed operations will be performed by the second programmer. The liquid chemicals are placed in bottles or breakers under the counter 18 and the various spray heads C served by siphoning the liquid from the respective container, each aspirated by its own solenoid actuated valve in the corresponding airline 102. It is important to note that the liquid is atomized within the pot chamber in a cone or fan of spray as the turntable D moves the disks thereunder. The fine mist of liquid particles together with the movement of the disks with respect thereto permits intimate surface interaction.

While the apparatus itself has been described herein with particular reference to a specific embodiment and the method of its use generally directed and related to semiconductor wafer applications, it is of course understood that the invention is to be construed in a broad sense. That is, emphasis may have been placed herein on certain features for reasons of illustration, and/or because space requirements and language limitations so required. Nevertheless, in any event, the present invention is susceptible of almost unlimited application where liquid is utilized to treat small, flat disks, plates or similar articles. To be included in this latter class of articles may be thin, glass substrates to which copper overlays may be applied. Microcircuits, printed circuits and even microscope slides may be included in this flat article category. It is apparent that the configuration of the disks or plates is of no consequence.

For example, the apparatus itself may be used for cleaning, washing or rinsing. In this manner the disks may be cleansed by the use of water and organic and/or inorganic solvents or cleaning agents, such as acid or soap solutions. However, the apparatus can also be used for developing patterns which have been photographically exposed upon the surface of sensitive coatings. Furthermore, the apparatus may be employed for etching away or treating the surface of the disks themselves by exposure to hydrofluoric acid, or other suitable etching agents. Still another use is stripping whereby wax emulsions coated upon the disks for masking against etching fluids can be washed away in preparation for subsequent treatment.

It is most significant to note that the disks X remain untouched by the hands after they have been once loaded upon the carrier E. The carriers E transfer the disks to and from the treatment apparatus in preparation for the various treatment or washing and cleaning stages. The carriers themselves do not actively participate in the disk treatment operations after having been loaded upon the turntable D. However, as has been expounded hereinbefore, the dished upper surface 194 of the carriers participates in cleaning the vessel proper. That is, it acts as a reservoir for catching cleaning or rinsing liquid from the central head C1 and throwing a swirled sheet of this liquid out by centrifugal action against the interior of the pot. In this regard, it is also to be noted that the carriers E may be without a canopy portion 192 and, in such a case, merely fit about a central turret (not shown) upstanding from the turntable D itself. In the latter instance, an equivalent dished zone would be formed in the turret of the turntable D to perform the function of collecting the liquid and swirling it out as a centrifugal sheet against the interior of the lid and vessel.

It is also important to observe that the apparatus can readily be disassembled so as to permit rapid interchanging of all parts, including the dome 42 and pan 30 which may be subject to erosion during etching cycles. Interchangeability of the vessel or pot components themselves may also be important where a single apparatus is utilized for a plurality of treatment schedules and operations, as where interaction of operation chemicals may cause objectionable contamination or where the particular coating on the interior of the vessel is intolerant of particular chemicals.

As has been mentioned hereinbefore, one of the basic features of the instant invention is to expose the surface of flat articles to an atomized spray of liquid while the articles are moving with respect to the treatment spray. Such action provides an intimate surface interaction of the sprayed liquid mist which action is to some extent augmented by the "abrasive" effect by the atomized fog. In this consideration, the relative speed or the relative motion between the disks X and the impinging spray can be quite critical. Thus, if the rotational speed of the turntable D, in this case, is too slow, improper cleaning can occur with attendant spotting of the wafers. In contradistinction, should the relative motion be too great, the sprayed liquid chemical may not get a chance to penetrate into the interstices of the wafer surface and further reduce opportunity for chemical reaction and interaction during exposure. Finally, it is to be observed that an endeavor has been made to expose the maximum upper surface of the wafers to the spray as is possible. In this connection, the use of a vacuum chuck upon the lower surface of the disks X thereby affording maximum upper surface exposure without puddling or restriction to flow of liquid which could be caused by edge chucking. Nevertheless, attention is invited to the fact that the vacuum chuck does also limit the speed of revolution of the turntable since the centrifugal force cannot exceed the shear strength of the vacuum holding interface.

With respect to the auxiliary cups 128 which are mounted upon the pedestals 126, it is, of course, understood that they serve the function of extending the holding surface and hence increase the shear strength of the joint interface. The auxiliary cups 128 because of their flexible plastic construction also lend to resiliency in support. However, it is also to be recognized that the disks X may be placed directly upon the pedestals 126 themselves.

Although this invention has been described in considerable detail, such description is intended as being illustrative rather than limiting since the invention may be variously embodied, and the scope of the invention is to be determined as claimed.

What is claimed is:

1. A method for treating thin semiconductor wafers comprising the steps of loading a plurality of untreated wafers in a carrier member having a plurality of circumferentially spaced apertures so that the marginal edges of the wafers overlie the marginal edges of the respective apertures, lowering the carrier upon a rotatable member having a plurality of vacuum pedestal chucks upstanding within a chamber and registering with the carrier apertures until the respective wafers sit upon the respective pedestals and are released from the carrier mounting, closing the chamber and exhausting the air to the pedestal chucks so that the individual wafers are retained thereupon, spinning the rotatable member within the chamber and exposing the rotating disks to sprays of liquid chemicals and water, and then exposing the wafers to a heated gas while the rotatable member is being spun whereby the various liquids will be centrifugally spun off the surface of the wafers without leaving stains thereon.

2. A method for treatment of thin wafers comprising the steps of seating a plurality of wafers in a tray which is apertured so as to expose the lower face of the wafers, transferring the tray to a rotatable turntable member having vacuum pedestal chucks thereon which register with the tray apertures so that the vacuum chucks receivably strip and retain the respective wafers from the tray as the tray is placed on the turntable, rotating the turntable and the tray so as to present the upper face of each wafer sequentially in the path of a mist spray of respective treatment liquids as the rotatable member is turned, sequentially spraying the turned wafers with a plurality of sprays, and removing the tray from said rotatable member so as to disengage the wafers from the vacuum pedestal chucks whereby the wafers can be treated at successive stations without being individually touched.

3. Apparatus for treating thin semiconductor wafers comprising a closed housing having a lower chamber and an upper closure lid, a plurality of spray heads on said lid for directing a cone of respective treatment liquids as a mist into said housing, a turntable member having a plurality of vacuum pedestal chucks, each said chuck being adapted to receive and hold a wafer thereon, a tray for carrying a plurality of wafers, said tray being mountable by index pins on said turntable member so as to detachably transfer the untreated wafers simultaneously from said tray and deposit them in a locked position on said chucks for exposure to the mist atmosphere, and means for rotating the turntable to present each wafer sequentially under the spray heads in the path of the cone of treatment liquids, whereby the plurality of treated wafers are simultaneously detached from said chucks when said tray is removed from said turntable.

4. An apparatus as set forth in claim 3 where said tray comprises a generally circular portion having a plurality of circumferentially spaced flat recessed pocket portions adjacent the periphery thereof, said pocket portions each being of a diameter larger than the wafer diameter and having an aperture extending therethrough smaller than the wafer diameter so as to seatedly support the margins of the respective wafer whereby the wafers may be carried about conveniently and loaded upon the vacuum chucks which register with the apertures and are adapted to extend freely therethrough so as to enable the wafers to be seated upon the respective chucks by lowering said tray thereon with the chucks projecting through the apertures.

5. Liquid spray apparatus for semiconductor wafers comprising a housing having a chamber therein and a lid, means for directing an atomized spray of liquid within said housing, a rotatable member having a plurality of upstanding vacuum pedestal chucks within the housing for detachably supporting wafers thereon, said rotatable member having a hollow shaft downwardly depending therefrom, a vapor-liquid seal rotatably embracing said shaft within the housing chamber, a mechanical bearing rotatably supporting said shaft in said housing, vacuum seal means supported exterior to said housing and rotatably embracing the bottom of said shaft, and suction means communicating with said vacuum seal means and said hollow shaft.

6. The invention of claim 5 wherein the periphery of said lid includes a soft resilient gasket, and a peripheral ridge of inverted V-shaped cross-section on said housing cooperatively engaging said gasket to define a low gradient seal when said lid is closed.

7. An apparatus for chemical treatment of semiconductor wafers comprising a closed housing; a turntable rotatably mounted in said housing having a plurality of upstanding vacuum pedestal chucks arranged in a circular pattern at the outer portion of said turntable, a hollow downwardly depending shaft, and suction means forming a passageway between said hollow shaft and said pedestal chucks; a rotary vacuum seal between said housing and said shaft; vacuum means communicating with the hollow shaft to provide a vacuum suction at the face of said pedestal chucks for locking wafers to said chucks; a plurality of aspirating liquid spray heads arranged in a circular pattern opposite said wafers on said chucks; means for rotating said turntable; and means for selectively and sequentially operating said spray heads, whereby each said wafer is periodically presented under the cone of spray mist from a spray head once each revolution of the turntable during a selective spraying operation.

8. An apparatus as set forth in claim 7, which further includes a carrier and loading tray adapted to be mounted on said turntable, comprising a tray portion having a plurality of apertures, recessed pockets around the apertures for holding wafers therein, said apertures and pockets having the same pattern as the upstanding pedestal chucks, and means on said tray and said turntable for aligning said tray with said pedestal chucks, where mounting said tray on said turntable causes the pedestal chucks to remove said wafers from said tray and subsequent removal of said tray from said turntable removes said wafers from said vacuum chucks.

9. A combined semiconductor wafer carrier tray and loading device for stacking in a nest with other trays in registration one upon the other or upon a turntable of a wafer processing apparatus, comprising a circular tray portion having a plurality of similar circumferentially spaced apertures therein smaller than the size of the wafers to be carried, a like plurality of recessed pockets in said tray about the respective apertures and having a diameter slightly larger than the wafers, a peripheral skirt downwardly projecting from the tray position, a plurality of circumferentially spaced indexing holes in said tray for registering said tray on said turntable, and raised portions on said tray cooperating with said peripheral skirt for stacking in vertical registration said trays one upon the other without the trays touching the wafers in the recessed pockets.

References Cited

UNITED STATES PATENTS

| | | | |
|---|---|---|---|
| 846,030 | 3/1907 | Hullhorst | 21—105 |
| 995,148 | 6/1911 | Johnston | 134—102 |
| 1,117,550 | 11/1914 | Coburn et al. | 134—95 |
| 1,446,921 | 2/1923 | Montag. | |
| 2,078,699 | 4/1937 | Taylor et al. | |
| 2,184,204 | 12/1939 | Walker | 134—153 XR |
| 2,316,145 | 4/1943 | Futrell | 21—105 |
| 2,372,205 | 3/1945 | Hertz | 134—153 XR |
| 2,397,207 | 3/1946 | Sachtleben | 134—21 XR |
| 2,420,396 | 5/1947 | Heineman | 134—21 XR |
| 2,624,352 | 1/1953 | Illian | 134—95 XR |
| 2,671,457 | 3/1954 | Cozzoli | 134—153 XR |
| 2,721,566 | 10/1955 | Brucker | 134—153 XR |
| 2,725,063 | 11/1955 | Huffman | 134—153 XR |
| 2,767,110 | 10/1956 | Frekko | 134—33 XR |
| 2,993,493 | 7/1961 | Edhofer | 134—21 XR |
| 3,041,225 | 6/1962 | Emeis | 134—33 XR |
| 3,261,660 | 7/1966 | Wilkinson | 21—105 |

MORRIS O. WOLK, Primary Examiner

JOSEPH T. ZATARGA, Assistant Examiner

U.S. Cl. X.R.

134—21, 33, 102, 149; 211—1.5; 248—362